Nov. 13, 1928.
P. H. HISCOCK
1,691,153
EARTH SCOOP
Filed Aug. 26, 1926
2 Sheets-Sheet 1
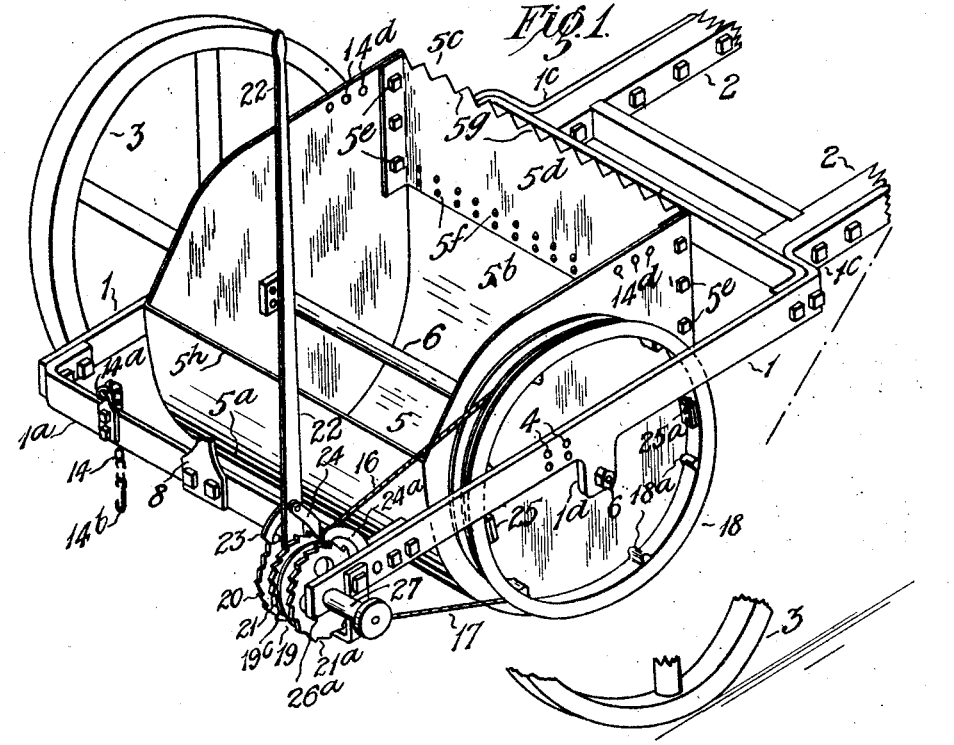
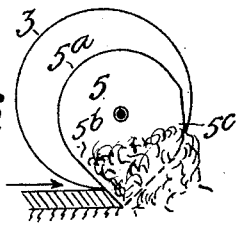
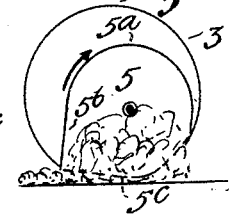
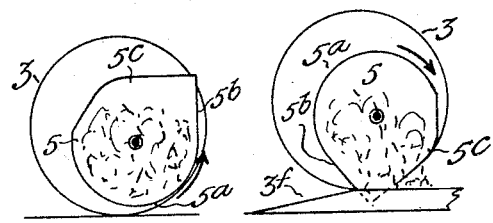
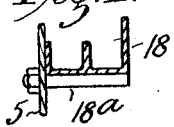
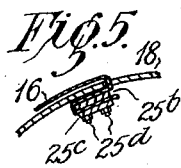
P. H. Hiscock
inventor
By: Marks & Clerk
Attys.

Nov. 13, 1928.
P. H. HISCOCK
1,691,153
EARTH SCOOP
Filed Aug. 26, 1926
2 Sheets-Sheet 2
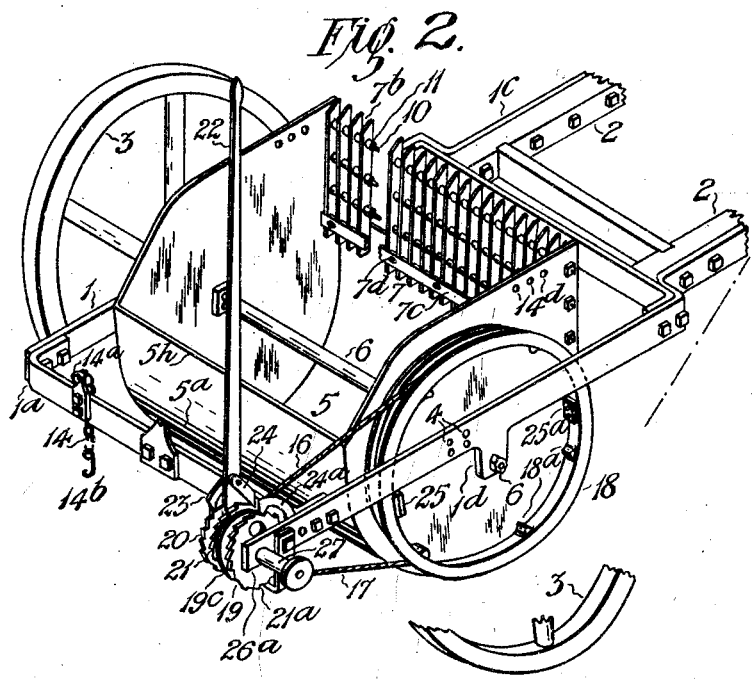
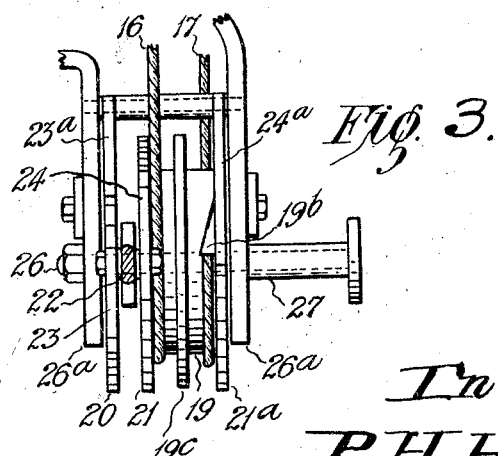
Inventor
P H Hiscock,
By Markel...
Attys Patented Nov. 13, 1928.

1,691,153

UNITED STATES PATENT OFFICE.

PERCY HERBERT HISCOCK, OF PYALONG, VICTORIA, AUSTRALIA.

EARTH SCOOP.

Application filed August 26, 1926, Serial No. 131,759, and in Australia November 21, 1925.

An object of this invention is to provide an improved wheeled earth scoop usable in gravel, sand and so on (all hereinafter called earth), which will be of light draught, easy for a driver seated on or standing by the scoop to operate, and usable at will as a tip dray, and in various other working positions.

A further object is to provide for the screening of earth as it is scooped, screening combs of various gauges being provided. Land surfaces can be operated on by making successive trips of the scoop and the gauge of the earth picked up at each trip will be as predetermined.

My scoop enables earth to be levelled; and it allows of dumping the scooped earth so as to make a fairly level surface. This function is of use in road construction. The scoop operates either as a mechanical shovel or as a scraper as required. For brevity the word scoop is used hereinafter with reference to the earth container or scoop body.

I illustrate by drawings herewith an embodiment of my invention, but the construction shown may be modified while retaining features hereinafter claimed.

Figure 1 is a perspective view from the rear of my machine in load carrying, non-scooping position, the near wheel being almost wholly removed.

Fig. 2 is a perspective view of a slightly modified form of a screening comb on the machine, the spaces between its teeth being variable to cause the gauge of material scooped to be as predetermined.

Figure 3 is a plan of part of the adjusting mechanism for rotating and holding the scoop.

Figure 4 is a sectional view of the rim of the control pulley attached to the scoop.

Figure 5 is a sectional view of means of attachment of a control rope to the winding drum.

Figures 6 to 9 show outlines of a scoop and one road wheel.

Figure 6 shows the scoop in advancing position, as it scoops earth in front.

Figure 7 shows the scoop rotated into a position to deposit previously scooped earth in a layer as the scoop advances.

Figure 8 shows a scoop rotated to a non-scooping position and filled with a load of previously scooped or other earth.

Figure 9 shows the scoop in a different dumping position from that of Figure 7.

The scoop top is shown wholly open in Figures 1 and 8.

The frame 1 of my machine has any suitable draught means shown as, but not limited to, shafts 2, a tractor connection or a motor being usable. The frame rear 1ª is transverse to and connects its sides, which extend forwardly at 1ᶜ to the draught attachments. This frame is of suitable material as bar metal.

Stub axles project from the frame, 4 being holes in the frame to receive means to fasten these axles which support the ground wheels 3. Forward of the stub axles, the frame has downwardly projecting members, shown as lugs 1ᵈ, which carry a non-rotative axial member 6, on which the scoop 5 is freely suspended, member 6 passing through suitable anti-friction bearings in the scoop sides. A part, 5ª, of the outside surface of this scoop is arcuate or approximately so in section, and adjacent to it is a part 5ᵇ which in section is flat or approximately so, these parts in conjunction forming the outer surfaces of the container or scoop. The scoop can carry a relatively large amount of earth when its mouth 5ᶜ is uppermost as in Figure 8.

The scoop is revolvable, the position of parts 5ª, 5ᵇ, and 5ᶜ being varied as required; and the balance of the scoop on its axle is such that when fully or moderately loaded, it will not tend to discharge its contents even if free of the control mechanism hereinafter described, but will find a position of equilibrium, and can thus serve as a dray.

At the scoop mouth is a lip, consisting of a detachable earth cutting plate 5ᵈ which has teeth 5ᵍ and is secured by bolts 5ᵉ, 5ᶠ; this plate is, however, interchangeable with a screening comb 7, having spaced bars 7ª the points or cutting teeth of which 7ᵇ are of any suitable detail.

When the scoop is drawn forward, with teeth 5ᵍ or 7ᵇ entering the ground so that it detaches earth which enters the scoop as in Figure 6, the earth will be dragged to the place desired. Or the earth can be gradually released at any time so that it forms a layer. This is done by locating the scoop as in Figure 7. Or the earth can be dumped to leave a heap, by rotating the scoop to raise the lip as indicated by the arrow in Figure 7.

Upon rotation of the scoop to the position of Figure 8, it retains its load for transport purposes; and by moving the machine on to a ramp 3ᶠ Figure 9, the load can be easily dumped by rotating the scoop. In Figures 7 and 9 arrows illustrate upward and rearward rotation respectively of the scoop lip. The scoop will be positioned as in Figures 6 to 9 according to the effect desired.

Scoop rotation will be controlled by a driver, a seat being available at the machine rear for his use, the base of a seat standard being shown at 8, a detachable standard of known form being usable at will.

When the scoop is cutting earth and taking up a load and the wheel tyres will be consequently somewhat, but more or less, embedded in the soil owing to the weight of the machine, it will be necessary to counteract changes of position of the cutting lip thereby produced. For this purpose the driver will from time to time as desirable adjust mechanism about to be described, to locate the cutting edge in proper operative position, that is above the tyre base line.

My machine is effective in screening gravel; that which is of or coarser than the desired gauge is raised into the scoop, smaller material being wholly or almost wholly left on the ground. The screen gauge can at any time be varied. To fit a screening comb in working position the holding bolts 5ᵉ are removed and the rods 10 substituted; on these rods bars 7 are mounted, any easy means for adjusting the spacing being usable; thus ferrules 11 are set intermediately, to regulate the gauge. The comb rear has cross bar 7ᶜ to receive fastening means shown as bolts 7ᵈ.

The scoop will if required cut hard or very resistant ground, including stiff clay, to allow of which I provide stress receiving members, including a chain 14 connected to a bracket 14ᵃ on the frame rear member 1ᵃ and having means to grip the scoop edge 5ʰ, this means being shown as a hook 14ᵇ; and additional chains are used at will connected to suitable parts of the scoop, for which purpose a series of holes 14ᵈ is shown.

The scoop rotation and fixing mechanism utilizes flexible members, hereinafter called ropes 16, 17, secured at their ends within a grooved pulley 18 which is fixed by bolts (not shown) adapted to enter bosses 18ᵃ, the said bolts passing through one side of the scoop so that the pulley rotates with it. At the frame rear, at one side there is a winding drum 19, which has rope tracks, and is fitted with a series of ratchet wheels 20, 21, 21ᵃ each of which rotates simultaneously with the drum, wheel 20 being fixed to the drum axle 26 and wheels 21, 21ᵃ being fixed to the drum. There is or are one or more pawls for each set of ratchet wheels; thus wheel 20 has pawls 23 and 23ᵃ; wheel 21, pawl 24; and wheel 21ᵃ, pawl 24ᵃ. Any of these pawls can be set by the driver by hand from any convenient position to engage its ratchet wheel, or it can be similarly released. Ropes 16, 17 are connected to the drum by passing the end of each through a hole in a rope path to a clamp in the drum. The drum is fixed to an axle 26 rotatable in supports 26ᵃ on the machine frame.

To prevent any rope fouling on the drum as it rotates, the drum is provided with a guiding wedge 19ᵇ; and to keep the ropes apart, even when considerable lengths thereof are coiled on the drum, the drum carries a rib 19ᶜ.

A lever 22 which carries two oppositely set pawls 23, 24, pivoted to it, is shown erect engaging respectively the ratchets 20, 21.

The machine is fitted with a firm and convenient foot stay for the driver when he has to apply considerable strength to move control lever 22. Thus 27 is a foot stay formed by extending the axle 26. The control ropes extending from the drum to pulley 18 are fixed to the latter, the method shown being to pass each through a hole in the base of the pulley groove provided for that rope, to a clamp 25, 25ᵃ. Each clamp comprises plates 25ᵇ, 25ᶜ which are connected by bolts 25ᵈ to grip the rope end. These clamps facilitate rope adjustment, allowing slack to be taken up and regulating the tension of the ropes.

According to the direction in which the drum is to be turned, one or other of pawls 23, 24 and a check pawl 23ᵃ or 24ᵃ, is swung by the attendant into its inoperative position.

Assuming the scoop to be in the position of Figures 1 and 8—then to move the scoop to the filling position, Figure 6, pawls 23, 23ᵃ are swung by the attendant to an inoperative position, and lever 22 is moved so as to make pawl 24 turn the ratchet 21 which turns drum 19, paying out rope 16 and winding rope 17 to turn pulley 18 and move scoop 5 to the position in Figure 6. The check pawl 24ᵃ prevents reverse movement of the drum. By a further movement of the scoop in the direction last mentioned the scraping position is reached, and the load will escape below the lip 5ᵈ to form a ground layer as in Figure 7. To return the scoop to carrying position, the attendant sets pawls 23, 23ᵃ to engage their ratchet, and swings pawls 24, 24ᵃ into inoperative positions. By moving the lever he then brings the scoop to the required position. Further movement of the scoop will shift it into its load dumping position shown by Figure 9.

I claim:—

1. A rotatable scoop, having a wheeled frame, and at one side of the scoop rear a series of ratchet wheels fixed on a rotatable winding drum, a plurality of ropes each fastened at one end to said drum, and extending therefrom to a pulley fixed at the side of the scoop, the other ends of the ropes being fastened to the pulley, a pair of pawls bearing on different ratchet wheels of the said series either pawl of said pair being raisable to allow of rotation of the series of ratchet wheels in a distinctive direction, the unraised pawl preventing reverse rotation, and a lever carrying a pair of pawls each locatable to bear on a different ratchet wheel so that each of these pawls is adapted to rotate the drum in a distinctive direction according to the direction of movement of the lever, rotation of the drum moving the ropes, and thereby rotating the pulley and scoop, adjusting the latter into either scooping, load carrying non-scooping, or discharging, position, at will.

2. A rotatable scoop as set forth in claim 1, and having at its forepart a screening comb.

3. A rotatable scoop as set forth in claim 1, and having at its forepart a screening comb, having its teeth mounted on transverse bars separated by spacers which are adapted to regulate the widths of the spaces between the comb teeth.

In witness whereof I have hereunto set my hand.

PERCY HERBERT HISCOCK.